INVENTORS
Hans O. Schjolin
Donald K. Isbell
BY Craig V. Morton
Their Attorney

Oct. 2, 1956

H. O. SCHJOLIN ET AL 2,765,052

WEAR ADJUSTMENT FOR BRAKES

Filed April 1, 1954

INVENTORS
Hans O. Schjolin
Donald K. Isbell
BY
Craig V. Morton
Their Attorney

United States Patent Office 2,765,052
Patented Oct. 2, 1956

2,765,052

WEAR ADJUSTMENT FOR BRAKES

Hans O. Schjolin, Birmingham, and Donald K. Isbell, Pontiac, Mich., assignors to General Motors Corporation, Detroit, Mich., a corporation of Delaware Application April 1, 1954, Serial No. 420,285

7 Claims. (Cl. 188—79.5)

This invention relates to brakes for motor vehicles, and particularly to hydraulic brakes.

In hydraulic brake systems used on motor vehicles there is a considerable amount of heat absorbed by the hydraulically operated wheel cylinders mounted in the brake assembly. The wheel cylinders comprise the conventional cylinder and piston assembly with hydraulic fluid being supplied to the cylinder to actuate the piston therein. The piston is operably connected with the brake shoes to effect operation of the shoes in conventional manner.

As the friction lining on the brake shoes wears due to normal usage, the reciprocal stroke of the piston in the cylinder of the wheel cylinders increases in proportion to the wear of the friction linings on the brake shoes. In conventional brake structures the adjustment of the brake shoes relative to the brake drum to restore the normal brake shoe clearance after wear of the friction linings results in a requirement of a greater reciprocal stroke of the piston in the wheel cylinder. This added liquid displacement in the wheel cylinder results in a greater volume of hydraulic fluid being heated in the wheel cylinder which varies the effectiveness of the brake system. With a greater volume of brake fluid in the wheel cylinder there is greater tendency toward gasification of the hydraulic fluid which makes for a spongy feeling in the operation of the brakes. In fact the gasification can become so serious during prolonged heavy brake applications as to result in failure of the brakes to operate properly because of the compressibility of the gases evolved from the brake fluid.

It is therefore an object of this invention to provide a brake for a motor vehicle wherein the force applying mechanism for the brake is constructed and arranged in a manner to provide a minimum volume of hydraulic fluid in the wheel cylinder and to maintain the volume of fluid in the wheel cylinder substantially constant irrespective of the number of brake adjustments required to adjust the brake shoes relative to the brake drum.

In accomplishing the foregoing object it is an object of the invention to provide a force applying and adjusting mechanism for a hydraulic brake wherein the brake shoe adjusting device is disposed between a brake shoe and the force applying device in a manner that the brake shoe is movably adjusted relative to the force applying device in a manner that the normal retracted position of the force applying device will always be the same irrespective of the adjustment made on the brake shoe relative to the force applying device.

Further objects and advantages of the present invention will be apparent from the following description, reference being had to the accompanying drawings wherein a preferred form of the invention is clearly shown.

Figure 1:
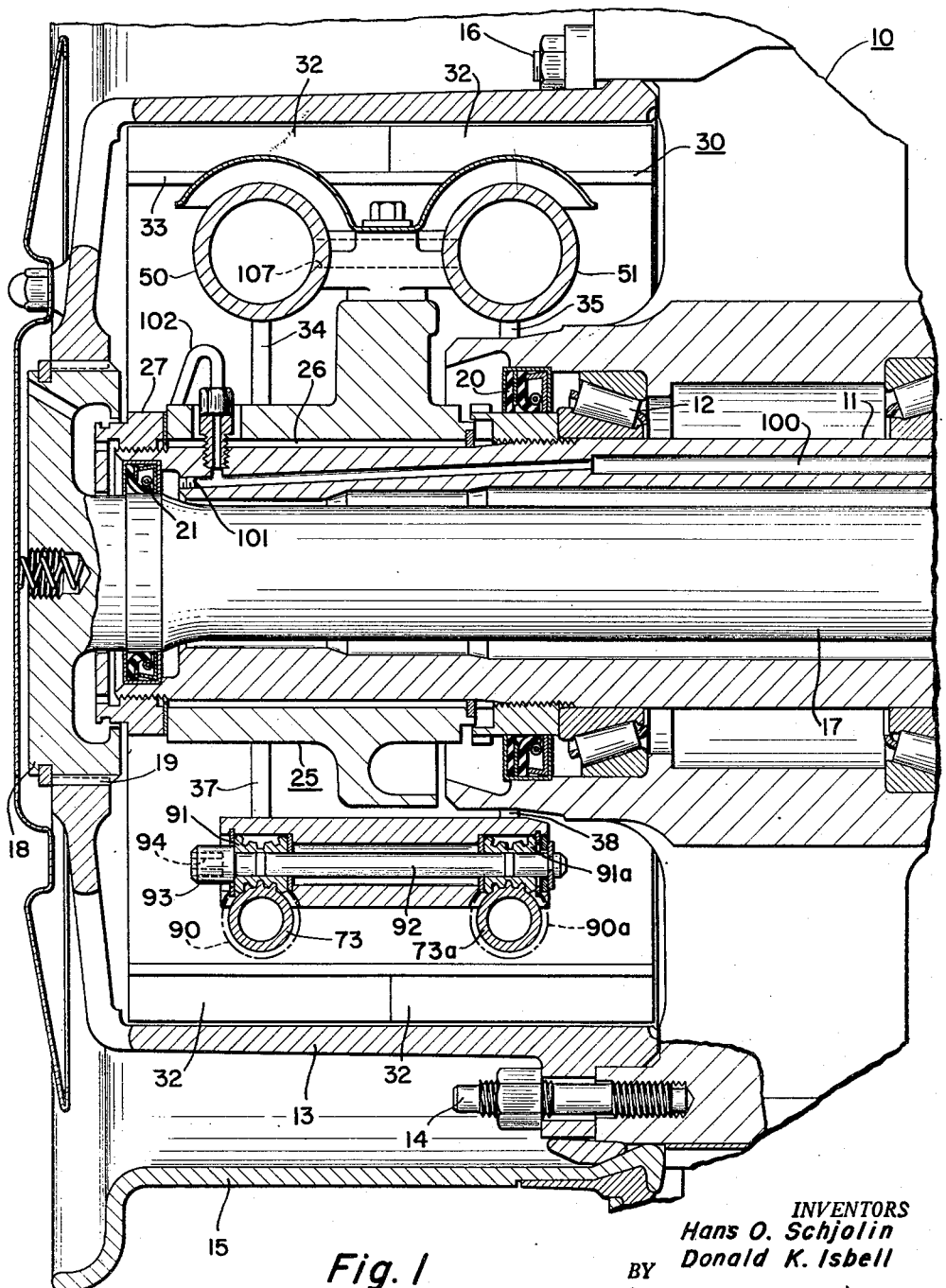
Figure 1 is a longitudinal cross sectional view taken substantially along line 1—1 of Figure 2.

In this invention the brake structure is incorporated within a vehicle wheel 10 that is supported upon the axle housing 11 by means of an anti-friction bearing 12. A grease seal 20 is placed between the wheel 10 and the axle housing 11 to prevent loss of lubricant through the anti-friction bearing 12. The wheel 10 supports a brake drum 13 mounted thereon by means of studs 14. The wheel 10 also supports a rim 15 secured thereon by means of studs 16.

The axle housing 11 encloses an axle shaft 17 that has the outboard end thereof provided with an enlarged head 18 that is connected with the brake drum 13 through a spline connection 19 whereby to drive the brake drum and the wheel from the axle shaft 17. A suitable grease seal 21 is placed between the axle shaft 17 and the axle housing 11 to prevent loss of lubricant at the outboard end of the axle shaft.

The brake structure comprises a brake spider 25 that is supported upon the axle housing 11 by means of a spline connection 26. A nut 27 is threaded on the outboard end of the axle housing 11 to retain the wheel spider 25 in its operative position.

The wheel spider 25 supports a pair of brake shoes 30 and 31, each of which has mounted thereon friction lining elements 32. The brake shoe 30 comprises a rim 33 reinforced by a pair of arcuately shaped webs 34 and 35. Similarly, the brake shoe 31 comprises a rim 36 that is reinforced by a pair of arcuately shaped webs 37 and 38.

Figure 3:
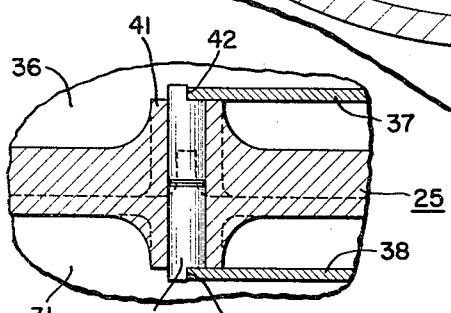
Figure 3 is a cross sectional view taken along line 3—3 of Figure 2.

The webs 37 and 38 of the brake shoe 31 have one end thereof engaging the anchor pin 40 carried in a boss 41 on the brake spider 25. The anchor pin 40 has opposite ends thereof projecting from the boss 41, as shown in Figure 3. These ends are semi-circular in shape to receive the flat ends 42 and 43 of the webs 37 and 38 whereby sliding action is obtained between the webs and the anchor pin for self-centering of the brake shoe 31 relative to the drum 13.

The brake shoe 30 is similarly carried on the anchor pin 45 supported in the boss 46 on the brake spider 25. The bosses 41 and 46 provide guides to maintain the axial position of the brake shoes relative to the brake spider 25. Also, guide pads 47 and 48 are carried on the brake spider 25 to maintain the axial position of the brake shoes relative to the brake spider 25.

The brake shoe 30 is operably connected with a pair of force applying devices 50 and 51. These force applying devices 50 and 51 are each composed of a hydraulic cylinder containing piston means connected with the webs 34 and 35 respectively of the brake shoe 30 to actuate the same into engagement with the brake drum 13.

Similarly, the brake shoe 31 is provided with a pair of force applying devices each comprising a cylinder and piston means operably connected therewith to actuate the shoe 31 into engagement with the brake drum 13.

Figure 2:
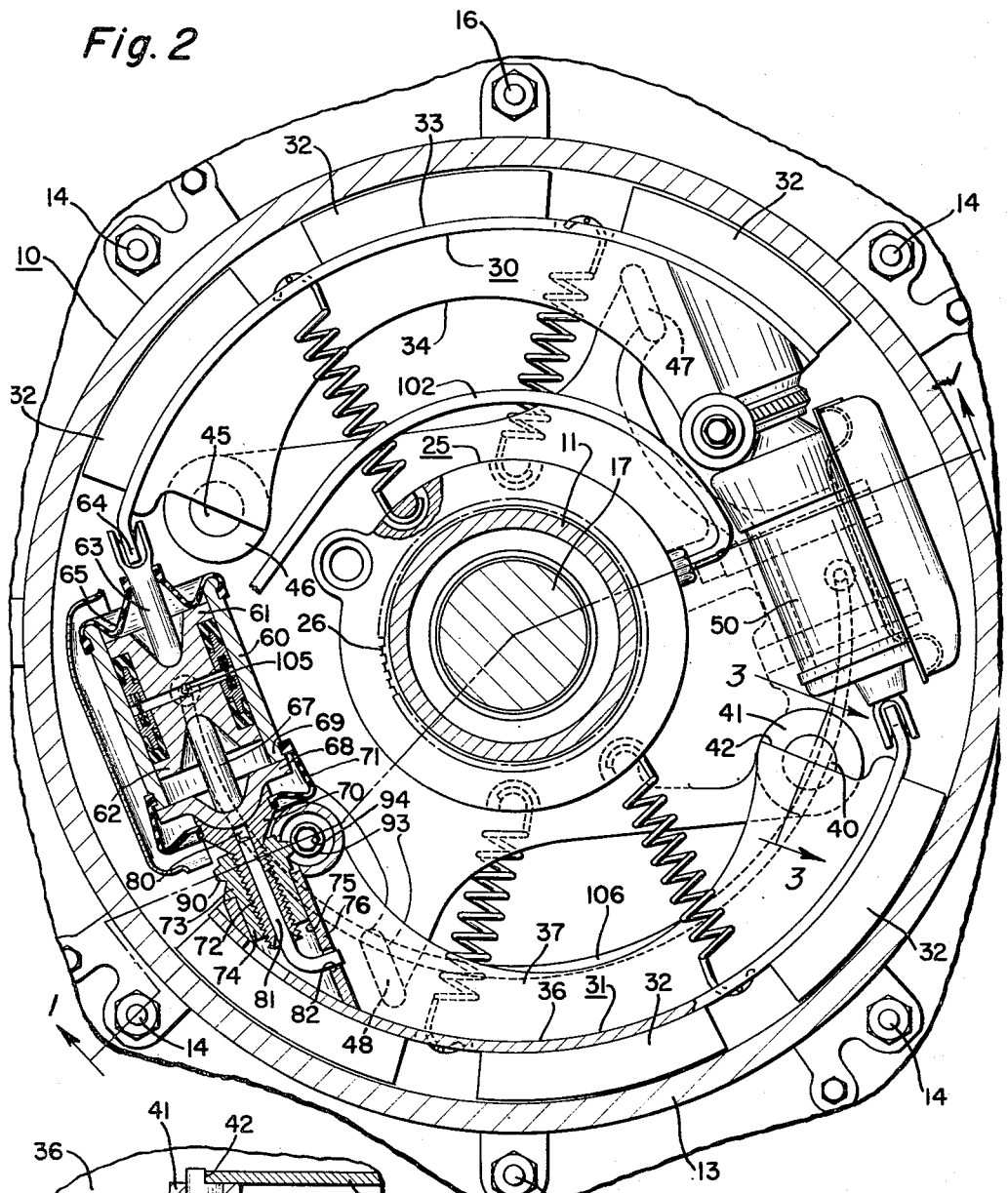
Figure 2 is an end elevational view of the brake structure of Figure 1 with certain parts thereof shown in cross section.

All of the force applying devices are of identical construction, one of which is more specifically illustrated in Figure 2.

Each of the force applying devices consists of a cylinder 60 that has a pair of pistons 61 and 62 mounted therein for reciprocation within the cylinder. The piston 61 has a plunger element 63 extending therefrom into engagement with the end 64 of the brake shoe 30. A suitable rubber boot 65 extends between one end of the cylinder 60 and the plunger 63 to prevent entry of dirt into the cylinder 60.

The piston 62 of the cylinder 60 has a plunger member 67 extending between it and a cap member 68 that engages the end 69 of the cylinder 60.

The cap member 68 has an extension 70 that may be integral with the cap 68, or as illustrated may be a separate element. A rubber boot 71 extends between the cylinder 60 and the extension 70 to prevent entry of dirt through this end of the cylinder.

The extension 70 of the cap member 68 has a threaded portion 72 that is threadedly received within the threaded nut 73. The nut 73 has a cylindrical portion 74 that is freely rotatable within the smooth walled bore 75 of the socket 76 carried on the brake shoe 31.

The extension 70 has a bore 80 that receives one end of a square pin 81. The opposite end of the square pin 81 passes through on opening 82 in the socket 76 whereby the extension 70 is prevented from rotation relative to the socket 76.

Obviously, rotation of the nut 73 on the threaded portion 72 of the extension 70 will effect adjusting movement of the brake shoe 31 relative to the wheel cylinder 60.

Each of the force applying devices, such as the devices 50 and 51 provided for the brake shoe 30 and similar devices provided for the brake shoe 31 has an adjusting device, as hereinbefore described, incorporated therewith and disposed between the wheel cylinder 60 of the force applying device and the brake shoe operated thereby. Thus, each brake shoe, 30 and 31, has two adjusting devices between it and the force applying devices that actuate the shoe. To provide for uniform adjustment between the force applying devices and the brake shoe operated thereby, it is necessary that both of the adjusting devices between the brake shoe and the force applying devices be adjusted simultaneously. For this purpose, each of the nuts 73 and 73a, illustrated in Figure 1, has a worm wheel 90 and 90a provided on the periphery thereof.

Each of the worm wheels 90 and 90a is engaged by worms 91 and 91a respectively that are splined upon the actuating shaft 92. The actuating shaft has an enlarged head 93 at one end provided with a hexagonal shaped bore 94 adapted to receive a wrench for rotating the shaft 92. Rotation of the shaft 92 will thereby rotate both worm wheels 90 and 90a to effect adjustment between the cooperating force applying devices and the brake shoe actuated thereby to maintain uniform the adjustment of both sides of the brake shoe and the force applying devices.

With the brake shoe adjusting device positioned between the brake shoe and the force applying device for actuating the same, the pistons 61 and 62 in the force applying device will always maintain a uniform stroke length irrespective of the amount of adjustment made between the wheel cylinders comprising the force applying devices and the brake shoes. Thus a minimum quantity of hydraulic brake fluid may be provided for each wheel cylinder, which volume of fluid will not vary greatly at any time.

Also, since pistons 61 and 62, either or both, maintain substantially the same stroke length irrespective of the amount of shoe adjustment required to maintain proper clearance between the shoes and the brake drum, the rubber boots 65 and 71 are not stretched beyond a predetermined amount. In fact the flexibility of the boots can be regulated according to the predetermined stroke of the pistons 61 and 62. Since the rubber boots are not required to extend to a length sufficient to take up for a long stroke of the piston 62 resulting from adjustment of the brake shoe relative to the drum when the friction linings wear, the life of the rubber boot is greatly extended.

Further, with the stroke length of the pistons 61 and 62 controlled within predetermined dimensional limits it is possible to make the cylinder 60 considerably shorter than would be required if the stroke length of the pistons had to take into consideration the full movement of the brake shoes relative to the drum resulting from wear of the lining. This enables the brake structure to be incorporated in a smaller diameter than would otherwise be the case.

Hydraulic fluid is supplied to the wheel cylinders through a passage 100 extending through the axle housing 11 closed at the outboard end of the axle housing by a plug 101. A pipe line 102 conducts the hydraulic fluid to one side of the force applying devices to the space between the pistons 61 and 62 through a passage 105. A second hydraulic line 106 conducts the hydraulic fluid from the opposite side of the force applying devices to the force applying devices 50 and 51, a passage 107 being provided between these devices for flow of hydraulic fluid.

While the form of embodiment of the invention as herein disclosed constitutes a preferred form, it is to be understood that other forms might be adopted as may come within the scope of the claims which follow.

What is claimed is as follows:

1. In a vehicle brake structure, the combination of, a brake drum, a cooperating pair of brake shoes engageable with said drum, a hydraulically operated force applying mechanism comprising a cylinder and piston assembly positioned between adjacent ends of said shoes to actuate the same into engagement with the brake drum, retraction spring means engaging said shoes to maintain the same in normal retracted position against the action of said force applying mechanism, an adjusting mechanism positioned between said force applying mechanism and one of said shoes comprising a plate member engaging one end of said cylinder on normal retraction of the brake shoe and including plunger means engaging said piston to effect movement of said plate outwardly relative to said cylinder on movement of said piston, said plate member including an extension operably connected with rotatable means on one of said shoes to effect adjusting movement of said shoe relative to said cylinder on rotation of said rotatable means whereby to provide for extension of the force applying and adjusting mechanism to compensate for wear of the linings on the shoes without changing the retracted position of said plate in engagement with said cylinder.

2. In a vehicle brake structure, the combination of, a brake drum, a cooperating pair of brake shoes engageable with said drum, a hydraulically operated force applying mechanism comprising a cylinder and piston assembly positioned between adjacent ends of said shoes to actuate the same into engagement with the brake drum, retraction spring means engaging said shoes to maintain the same in normal retracted position against the action of said force applying mechanism, an adjusting mechnism positioned between said force applying mechanism and one of said shoes comprising a plate member engaging one end of said cylinder on normal retraction of the brake shoe and including plunger means engaging said piston to effect movement of said plate outwardly relative to said cylinder on movement of said piston, said plate member including a threaded extension, a nut threadedly received on said extension and journaled in a socket on one of said shoes and freely rotatable therein to effect adjusting movement between said one shoe and said cylinder on rotation of said nut.

3. In a vehicle brake structure, the combination of, a brake drum, a cooperating pair of brake shoes engageable with said drum, a hydraulically operated force applying mechanism comprising a cylinder and piston assembly positioned between adjacent ends of said shoes to actuate the same into engagement with the brake drum, retraction spring means engaging said shoes to maintain the same in normal retracted position against the action of said force applying mechanism, an adjusting mechanism positioned between said force applying mechanism and one of said shoes comprising a plate member engaging one end of said cylinder on normal retraction of the brake shoe and including plunger means engaging said piston, to effect movement of said piston, said plate member including a threaded extension, a nut threadedly received on said extension and journaled in a socket on one of said shoes and freely rotatable therein, a non-rotatable member extending between said one shoe and said extension to prevent rotation thereof relative to said shoe, rotation of said nut on said extension effecting adjustable movement of said shoe relative to said cylinder.

4. In a vehicle brake structure, the combination of, a brake drum, a cooperating pair of brake shoes engageable with the drum, said shoes each having a pair of reinforcing webs spaced transversely of the respective shoes, a pair of hydraulic force applying mechanisms positioned between adjacent cooperating ends of said pairs of webs of said shoes, an adjusting device between each of said mechanisms and the respective webs of one of said shoes and including a rotatable member to effect adjustment movement between the said mechanisms and the said one shoe, and an adjustment actuating device supported rigidly between said webs transversely of said one shoe and engaging the rotatable member of each of said adjusting devices to effect simultaneously rotation of said rotatable members on rotation of said adjustment actuating device.

5. In a vehicle brake structure, the combination of, a brake drum, a cooperating pair of brake shoes engageable with the drum, said shoes each having a pair of reinforcing webs spaced transversely of the respsective shoes, a pair of hydraulic force applying mechanisms positioned between adjacent cooperating ends of said pairs of webs of said shoes, an adjusting device between each of said mechanisms and the respective webs of one of said shoes and including a rotatable member to effect adjustment movement between the said mechanisms and the said one shoe, a sleeve member extending between said webs of said one shoe transversely thereof, and a shaft member positioned within said sleeve having a gear member on each end thereof engaging the rotatable member of each of said adjusting devices to effect simultaneous rotation of said rotatable members on rotation of said shaft.

6. In a vehicle brake structure, the combination of, a brake drum, a cooperating pair of brake shoes engageable with the drum, said shoes each having a pair of reinforcing webs spaced transversely of the respective shoes, a pair of hydraulic force applying mechanisms positioned between adjacent cooperating ends of said pairs of webs of said shoes, an adjusting device between each of said mechanisms and the respective webs of one of said shoes including a threaded member, a nut rotatable on the threaded member of each of the adjusting devices, each of said webs of said one shoe having means provided with a bore to receive said nut journaled therein for free rotation in the bore, means forming a sleeve extending between said webs of said one shoe transversely thereof adjacent said means forming said bore, and a shaft within said sleeve having an actuating member thereon at each end thereof engaging the said nuts of said adjusting devices for concurrent rotation thereof on rotation of said shaft.

7. In a vehicle brake structure, the combination of, a brake drum, a cooperating pair of brake shoes engageable with the drum, said shoes each having a pair of reinforcing webs spaced transversely of the respective shoes, a pair of hydraulic force applying mechanisms comprising cylinder and piston assemblies positioned between adjacent cooperating ends of said pairs of webs of said shoes, an adjusting device between each of said mechanisms and the respective webs of one of said shoes comprising a plate member engaging one end of said cylinder and having means engaging said piston to effect movement of said plate outwardly relative to said cylinder on movement of said piston in said cylinder, said plate including a threaded extension, a nut threadedly received on said extension and rotatable in a socket in the web of said one shoe and freely rotatable therein, means extending between said webs of said one shoe transversely thereof adjacent the sockets on said webs forming a sleeve having a hollow bore, and a shaft within said sleeve having a gear member thereon at each end thereof engaging the said nuts rotatable in the said sockets in each of said webs of said one shoe to effect rotation of the said nuts simultaneously on rotation of said shaft.

References Cited in the file of this patent

UNITED STATES PATENTS

| | | |
|---|---|---|
| 1,294,424 | Dearborn | Feb. 18, 1919 |
| 2,366,946 | Whitacre | Jan. 9, 1945 |
| 2,475,492 | Goepfrich et al. | July 5, 1949 |
| 2,508,194 | Schnell | May 16, 1950 |